United States Patent Office 2,944,068
Patented July 5, 1960

2,944,068

17α-(1-ALKYNYL)- AND 17α-(1-ALKENYL)-ESTRA-2,5(10)-DIEN-17β-OLS AND ESTERS CORRESPONDING

William F. Johns, Morton Grove, Ill., assignor to G. D. Searle & Co., Chicago, Ill., a corporation of Delaware No Drawing. Filed Mar. 24, 1959, Ser. No. 801,443

7 Claims. (Cl. 260—397.5)

The present invention relates to steroids in which the A ring possesses a diene structure and, more particularly, to 17-(1-alkynyl)- and 17-(1-alkenyl)-estra-2,5(10)-dien-17β-ols and the esters derived therefrom.

The compounds of this invention are represented by the structural formula

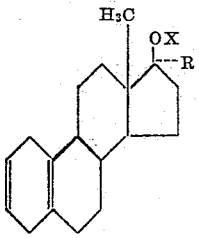

wherein X is selected from the group consisting of hydrogen and lower alkanoyl radicals and R is selected from the group consisting of lower 1-alkynyl and lower 1-alkenyl radicals. The radicals which are comprehended by the term "lower alkanoyl" are, for example, formyl, acetyl, propionyl, butyryl, valeryl, caproyl, enanthyl, caprylyl, and the branched-chain isomers thereof; said groups being the acyl radicals of the alkanoic acids containing less than 9 carbon atoms. Lower 1-alkynyl radicals represented by R are, for example, ethynyl, propynyl, 1-butynyl, 1-pentynyl, 1-hexynyl, 1-heptynyl, 1-octynyl and the branched-chain isomers thereof. The term "lower 1-alkenyl" encompasses, for example, vinyl, 1-propenyl, 1-butenyl, 1-pentenyl, 1-hexenyl, 1-heptenyl, 1-octenyl, and the branched-chain isomers thereof.

An intermediate, estra-2,5(10)-dien-17-one, in the preparation of the compounds of this invention can be prepared by a 3-step process from estr-5(10)-en-3,17-dione. A methanol solution of the latter diketone is reduced with an aqueous solution of sodium borohydride to afford estr-5(10)-en-3β-ol-17-one. Reaction of the latter substance in pyridine with p-toluenesulfonyl chloride yields 3β-(p-tolylsulfonyloxy)estr-5(10)-en-17-one. Upon treatment of the latter ester with activated alkaline aluminum oxide, estra-2,5(10)-dien-17-one is obtained.

The 17α-(1-alkynyl)estra-2,5(10)-dien-17β-ols of the present invention can be prepared by reaction of the aforementioned estra-2,5(10)-dien-17-one with acetylene or an alkyl acetylene in the presence of an alkaline catalyst. As a specific example, estra-2,5(10)-dien-17-one is treated with acetylene and potassium tertiary-pentoxide in a tertiary-amyl alcohol solution containing ether, to yield, 17α-ethynylestra-2,5(10)-dien-17β-ol.

The 17α-(1-alkenyl)estra-2,5(10)-dien-17β-ols of this invention can be prepared by partial catalytic hydrogenation of the aforementioned 17-(1-alkynyl)estra-2,5(10)-dien-17β-ols. This hydrogenation is accomplished by treating the latter acetylenic compounds with one molecular equivalent of hydrogen in the presence of a hydrogenation catalyst. For example, the above-disclosed 17α-ethynylestra-2,5(10)-dien-17β-ol is reacted with one molecular equivalent of hydrogen in the presence of a 5% palladium-on-calcium carbonate catalyst to afford 17α-vinylestra-2,5(10)-dien-17β-ol.

The 17α-(1-alkynyl)- and 17α-(1-alkenyl)-17β-(lower alkanoyloxy)estra-2,5(10)-dienes of the present invention can be prepared from the corresponding 17β-ols by reacting the latter with an alkanoic acid anhydride in pyridine. The process is exemplified by the reaction of 17α-vinylestra-2,5(10)-dien-17β-ol with acetic anhydride in pyridine to afford 17β-acetoxy-17α-vinylestra-2,5(10)-diene.

The compounds of the present invention are useful because of their valuable pharmacological properties. They have, for example, the capacity to decrease the serum concentration of cholesterol and the corresponding cholestrol:phospholipid ratio without at the same time producing the potent side effects characteristic of known estrogens adapted to regulation of cholestrol metabolism.

The invention will appear more fully from the examples which follow. These examples are set forth by way of illustration only and it will be understood that the invention is not to be construed as limited in spirit or in scope by the details contained therein as many modifications in materials and methods will be apparent from this disclosure to those skilled in the art. In these examples temperatures are given in degrees centigrade (° C.). Quantities of materials are expressed in parts by weight unless otherwise noted.

EXAMPLE 1

*Estr-5(10)-en-3β-ol-17-one*

To a solution of 165 parts of estr-5(10)-ene-3,17-dione in 3200 parts of methanol is added, at 10–15°, a solution of 6.2 parts of sodium borohydride in 150 parts of water; and the mixture is stirred for 45 minutes. The reaction mixture is treated with 85 parts of acetic acid and the resultant solution poured into 8000 parts of water. The resultant precipitate is collected by filtration, washed with water, dried, and dissolved in benzene. Chromatography of the benzene solution on 1700 parts of silica gel, followed by elution with a 10% ethyl acetate-90% benzene solution and recrystallization from acetone-petroleum ether affords estr-5(10)-en-3β-ol-17-one, M.P. 192–194°; $[\alpha]_D = +270°$. Its infrared absorption spectrum possesses maxima at 2.76 and 5.77 microns.

EXAMPLE 2

*3β-(p-tolylsulfonyloxy)estr-5(10)-en-17-one*

To a solution of 16.8 parts of estr-5(10)-en-3β-ol-17-one in 200 parts of pyridine is added, at 5°, 18 parts of p-toluenesulfonyl chloride. The resultant solution is allowed to stand at room temperature for 18 hours, then treated with excess aqueous sodium bicarbonate. The mixture is extracted with benzene and the benzene solution washed successively with dilute hydrochloric acid, water, aqueous sodium bicarbonate, and water; dried over anhydrous magnesium sulfate and evaporated to dryness in vacuo. Recrystallization of the residue from methanol yields 3β-(p-tolylsulfonyloxy)estr-5(10)-en-17-one, M.P. 135–137°; $[\alpha]_D = +182°$. It possesses maxima in the infrared at 5.76 and 6.28 microns.

EXAMPLE 3

*Estra-2,5(10)-dien-17-one*

A solution of 21.2 parts of 3β-(p-tolylsulfonyloxy)-estr-5(10)-en-17-one in 880 parts of benzene is passed over a column of 200 parts of activated alkaline aluminum oxide. This aluminum oxide has been activated according to the procedure described by Brockmann and Schodder (B. 74, 73 (1941)). Elution of the column with 880 parts of benzene, removal of the solvent, and recrystallization of the residue from methanol results in estra-2,5(10)-dien-17-one, M.P. 133–134°. It has a maximum in the infrared at 5.75 microns.

EXAMPLE 4

17α-ethylnylestra-2,5(10)-dien-17β-ol

A potassium tertiary-pentoxide solution is prepared by heating at reflux a mixture of 3 parts of potassium metal and 33 parts of tertiary-amyl alcohol until the metal is completely dissolved. The solution is cooled by means of an ice bath, diluted with 15 parts of ether, and treated with a rapid stream of acetylene for a period of 15 minutes. To the stirred solution is added 2 parts of estra-2,5(10)-dien-17-one and the resultant mixture is treated with a slow stream of acetylene, at 5°, for 6 hours. The reaction mixture is allowed to stand at 5° for 18 hours, then neutralized with 100 parts of saturated aqueous ammonium chloride. The resultant mixture is extracted with benzene and the benzene extract washed successively with water and dilute hydrochloric acid; dried over anhydrous magnesium sulfate; and evaporated to dryness under reduced pressure. The residue is adsorbed on a silica gel chromatographic column and eluted with a 70% benzene-30% petroleum ether solution. The solvent is evaporated and the crude product recrystallized from petroleum ether to afford 17α-ethynylestra-2,5(10)-dien-17β-ol, M.P. 98–98.5°; $[\alpha]_D = +1.3°$. Its infrared absorption spectrum possesses maxima at 2.81, 2.95 and 3.03 microns.

EXAMPLE 5

17α-(1-propynyl)estra-2,5(10)-dien-17β-ol

A mixture of 5 parts of estra-2,5(10)-dien-17-one in 300 parts of liquid ammonia and 2 parts of sodamide is saturated with propyne. The stirred mixture is treated with a steady stream of propyne for 4 hours, then neutralized with 10 parts of saturated ammonium chloride solution. The ammonia is allowed to evaporate and the residue is mixed with benzene and water. The organic layer is separated, washed with water, dried over anhydrous magnesium sulfate, and evaporated to dryness in vacuo. Chromatography on silica gel affords 17α-(1-propynyl)-estra-2,5(10)-dien-17β-ol which possesses maxima in the infrared at 2.83, 3.30, 3.55, 8.80, and 10.59 microns.

EXAMPLE 6

17α-vinylestra-2,5(10)-dien-17β-ol

A mixture of 5.6 parts of 17α-ethynylestra-2,5(10)-dien-17β-ol, 2.8 parts of 5% palladium-on-calcium carbonate catalyst and 300 parts of pyridine is stirred in a hydrogen atmosphere until one molecular equivalent of hydrogen is absorbed. The catalyst is removed by filtration, and the filtrate evaporated to dryness at reduced pressure. The residue is purified by chromatography on silica gel, elution with a 70% benzene-30% petroleum ether solution, and recrystallization from aqueous methanol to afford 17α-vinylestra-2,5(10)-dien-17β-ol, M.P. 106–108°; $[\alpha]_D = +117°$. It exhibits maxima in the infrared at 2.68, 2.97, and 6.08 microns.

By substituting 17α-(1-propynyl)estra-2,5(10)-dien-17β-ol and otherwise proceeding according to the herein described processes, 17α-(1-propenyl)estra-2,5(10)-dien-17β-ol is obtained. Its infrared absorption spectrum possesses maxima at 2.96, 3.30, 3.55, 8.80, and 10.59 microns.

EXAMPLE 7

17β-acetoxy-17α-(1-propynyl)estra-2,5(10)-diene

A mixture of 5 parts of 17α-(1-propynyl)estra-2,5(10)-dien-17β-ol, 200 parts of acetic anhydride and 400 parts of pyridine is heated on a steam bath for 4 hours. The mixture is cooled, diluted with water, and the resultant mixture extracted with methylene chloride. The organic extract is washed with water and evaporated to dryness in vacuo. The residue is purified by chromatography on silica gel and elution with a 40% benzene-60% petroleum ether solution to afford 17β-acetoxy-17α-(1-propynyl)-estra-2,5(10)-diene. This substance possesses maxima in the infrared at 3.30, 3.55, 5.82, 8.80, and 10.60 microns.

By substituting 17α-vinylestra-2,5(10)-dien-17β-ol, 17α-ethynylestra-2,5(10)-dien-17β-ol, or 17α-(1-propenyl)-estr-2,5(10)-dien-17β-ol, and otherwise proceeding according to the herein described processes, 17β-acetoxy-17α-vinylestra-2,5(10)-diene, 17β-acetoxy-17α-ethynylestra-2,5(10)-diene, and 17β-acetoxy-17α-(1-propenyl)-estra-2,5(10)-diene are obtained. The infrared spectra of the latter three products possess maxima at 3.30, 3.55, 5.78, and 6.08; 3.03, 3.30, 3.55, 5.78, and 8.80; and 3.30, 3.55, 5.78, 8.80, and 10.60 microns, respectively.

EXAMPLE 8

17β-butyroxy-17α-vinylestra-2,5(10)-diene

A mixture of 1 part of 17α-vinylestra-2,5(10)-dien-17β-ol, 35 parts of butyric anhydride, and 50 parts of pyridine is heated on a steam bath for 5 hours. The reaction mixture is cooled, diluted with water, and the resultant mixture extracted with benzene. The benzene extract is washed with water, dried over anhydrous magnesium sulfate, and evaporated to dryness in vacuo. The residue is purified by means of chromatography on silica gel to yield 17β-butyroxy-17α-vinylestra-2,5(10)-diene which exhibits maxima in the infrared at 3.30, 3.55, 8.80 and 10.60 microns.

By substituting 17α-ethynylestra-2,5(10)-dien-17β-ol and otherwise proceeding according to the herein described processes 17β-butyroxy-17α-ethynylestra-2,5(10)-diene is obtained. It possesses maxima in the infrared at 3.30, 3.55, 5.82, 8.80, and 10.60 microns.

What is claimed is:
1. A compound of the structural formula

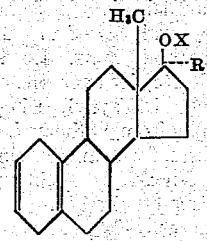

wherein X is selected from the group consisting of hydrogen and lower alkanoyl radicals and R is selected from the group consisting of lower 1-alkynyl and lower 1-alkenyl radicals.
2. 17α-ethynylestra-2,5(10)-dien-17β-ol.
3. 17α-vinylestra-2,5(10)-dien-17β-ol.
4. 17α-(1-propynyl)estra-2,5(10)-dien-17β-ol.
5. 17α-(1-propenyl)estra-2,5(10)-dien-17β-ol.
6. 17β-acetoxy-17α-vinylestra-2,5(10)-diene.
7. 17β-acetoxy-17α-ethynylestra-2,5(10)-diene.

References Cited in the file of this patent
UNITED STATES PATENTS

| | | |
|---|---|---|
| 2,729,654 | Colton | Jan. 3, 1956 |
| 2,878,267 | Szpilfogel et al. | Mar. 17, 1959 |
| 2,881,188 | Babcock et al. | Apr. 7, 1959 |